June 13, 1944.  J. H. WALKER ET AL  2,351,563
AIRCRAFT LOCATION INSTRUMENT
Filed Oct. 13, 1941
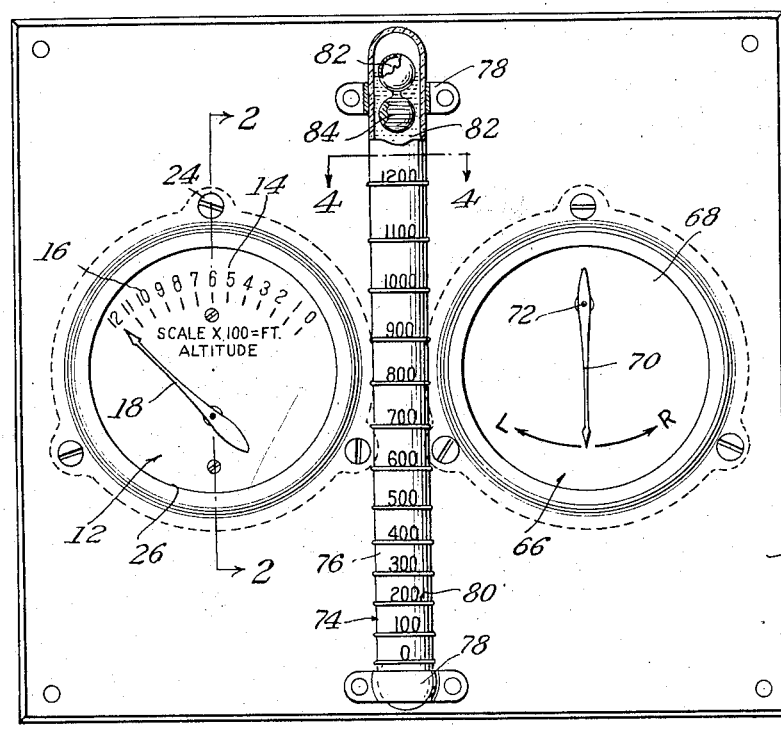
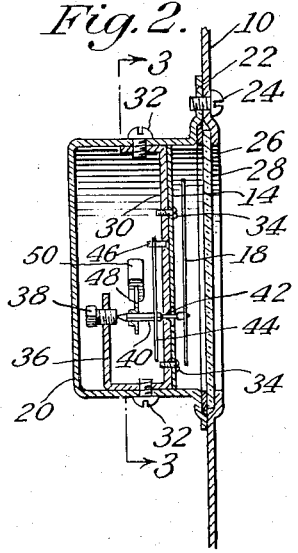
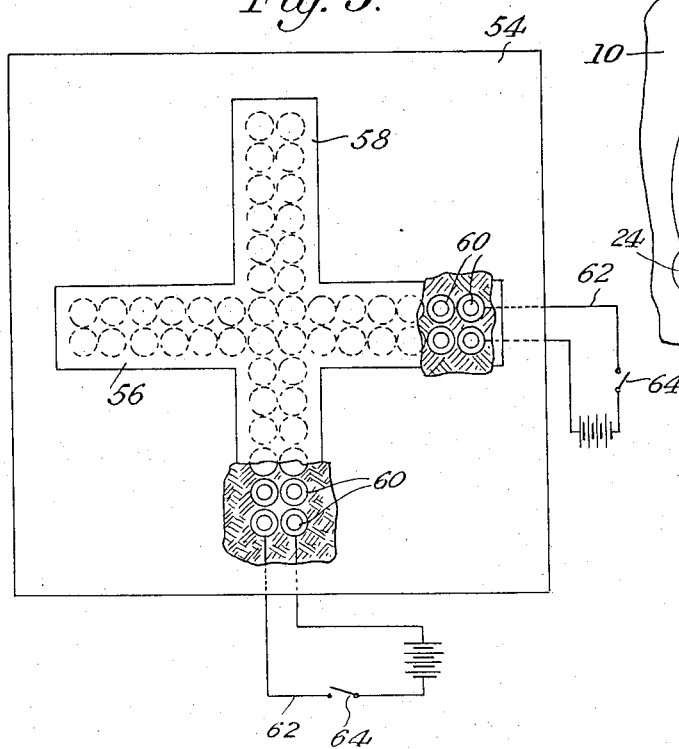
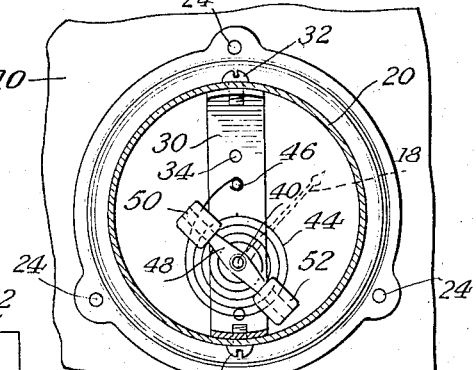
John H. Walker &
James M. Walker
INVENTORS
BY
Victor J. Evans & Co.
ATTORNEYS Patented June 13, 1944

2,351,563

UNITED STATES PATENT OFFICE 2,351,563

AIRCRAFT LOCATION INSTRUMENT

John H. Walker and James M. Walker, Ste. Genevieve, Mo.

Application October 13, 1941, Serial No. 414,900

1 Claim. (Cl. 175—183)

Our invention relates to landing facilities for aircraft and has among its objects and advantages the provision of an improved altitude, horizontal and vertical position indicator.

In the accompanying drawing:

Figure 1 is a face view of an instrument in accordance with our invention;

Figure 2 is a sectional view taken along the line 2—2 of Figure 1;

Figure 3 is a view taken from the position indicated by the line 3—3 of Figure 2;

Figure 4 is a sectional view along the line 4—4 of Figure 1; and

Figure 5 is a diagrammatic and partly sectional view of a landing field operating in conjunction with the instrument of Figure 1.

In the embodiment selected for illustration, we make use of a panel 10 upon which is mounted a vertical altitude indicating instrument 12 provided with a dial 14. In the dial illustrated, a scale 16 is provided thereon, which scale reads in units of feet and the altitude of the airplane above the landing field may be determined by noting the position of the needle 18 on the scale 16.

Instrument 12 comprises a cup-shaped housing 20 having a flange 22 fixedly secured to the panel 10 by screws 24. An opening 26 is provided in the panel for exposing the dial 14, and a glass plate 28 extends across the opening and is made secure through tightening of the screws 24.

Inside the housing 20 is secured a vertical strap 30 through the medium of screws 32, the dial 14 being fixedly secured to the strap 30 by screws 34. The lower end of the strap 30 is bent to provide an upstanding member 36 which is provided with a threaded opening for the reception of an adjusting screw 38 constituting a bearing for one end of a shaft 40, the opposite end of this shaft being extended through an opening 42 in the strap 30 and fixedly secured to the needle 18.

One end of a hair spring 44 is secured at 46 to the strap 30, and the opposite end of the spring is secured to the shaft 40. The spring 44 is so tensioned as to yieldingly hold the needle in the position of Figure 1 at the highest altitude reading thereon.

To the shaft 40 is fixedly secured a cross arm 48 having a magnet 50 secured to one end thereof and a non-magnetic counterbalance 52 secured to its opposite end. Clockwise rotation is imparted to the needle 18 of Figure 1 when the magnet 50 is brought into predetermined proximity with the landing field 54 having runways 56 and 58 constructed thereon. Each of the runways 56 and 58 is provided with a series of electromagnets 60, each group being electrically connected with a circuit 62 controlled by a switch 64. As a ship equipped with our instrument approaches the landing field 54, the operator of a field control office closes the selected runway so as to bring the instrument 12 into action. As the airplane descends upon the landing field, the magnet 50 is moved to swing the needle 18 in a clockwise direction in accordance with the altitude of the airplane so that the pilot may determine the altitude by noting the position of the needle 18 with respect to the scale 16.

A second instrument 66 is mounted on the panel 10, which instrument comprises a dial 68 and a needle 70 pivoted at 72 on the dial. The needle 70 is normally in the depending position of Figure 1 but functions as a magnet to be attracted by either the energized runways 56 or 58 as the airplane is brought into predetermined proximity to the landing field 54. When the needle 70 is attracted to the left, the airplane is in a position to the right of the landing field. Similarly, movement of the needle to the right indicates that the airplane is in a position to the left of the landing field. Thus the instrument 66 indicates the horizontal location of the airplane with respect to the landing field, while the instrument 12 indicates the altitude of the airplane with respect to the landing field.

A second altitude indicator 74 is mounted on the panel 10. This indicator comprises a glass tube 76 supported in brackets 78 secured to the panel 10. The tube 76 is provided with a scale 80 and contains a predetermined volume of liquid 82 having non-freezing properties.

Inside the tube 76 is provided a float 82 having a metal body 84 attached thereto, which body is under the influence of the energized landing field so as to descend in the tube 76 in accordance with the altitude of the airplane. Instrument 74 functions as a check on the instrument 12.

Without further elaboration, the foregoing will so fully illustrate our invention, that others may, by applying current knowledge, readily adapt the same for use under various conditions of service.

We claim:

In an instrument of the character described, a support panel having an opening therein, a cylindrical housing having the rear end closed and the front end open, an annular outwardly directed flange at the front end of the housing disposed against the panel, the opening in the panel registering with the interior of the housing, means for detachably securing the housing flange to the panel, a transparent dial disk having a graduated scale thereon mounted between the panel and housing flange to cover the front of the housing, a rigid diametrically extending strap secured vertically within the forward part of the housing, an upstanding support element disposed rearwardly of the strap, a horizontally disposed shaft having its forward portion journaled in an opening in the strap and its rear end pivotally supported in an adjustable screw mounted on said support element, a pointer fixed to the front end of the shaft for movement in co-acting relation with the dial scale, a transversely extending arm having its medial portion secured to the shaft, a magnet fixed on one end of the arm, a counterbalancing weight fixed on the opposite end of the arm, and a helical spring mounted transversely about the shaft having one end attached to the strap and the other end fastened to the shaft and tending to yieldingly hold the pointer in a predetermined position with relation to the scale.

JOHN H. WALKER.
JAMES M. WALKER.